Oct. 3, 1967  W. W. RAWSTRON  3,345,032
THREE-WAY BALL VALVE
Filed Nov. 10, 1964  2 Sheets-Sheet 1
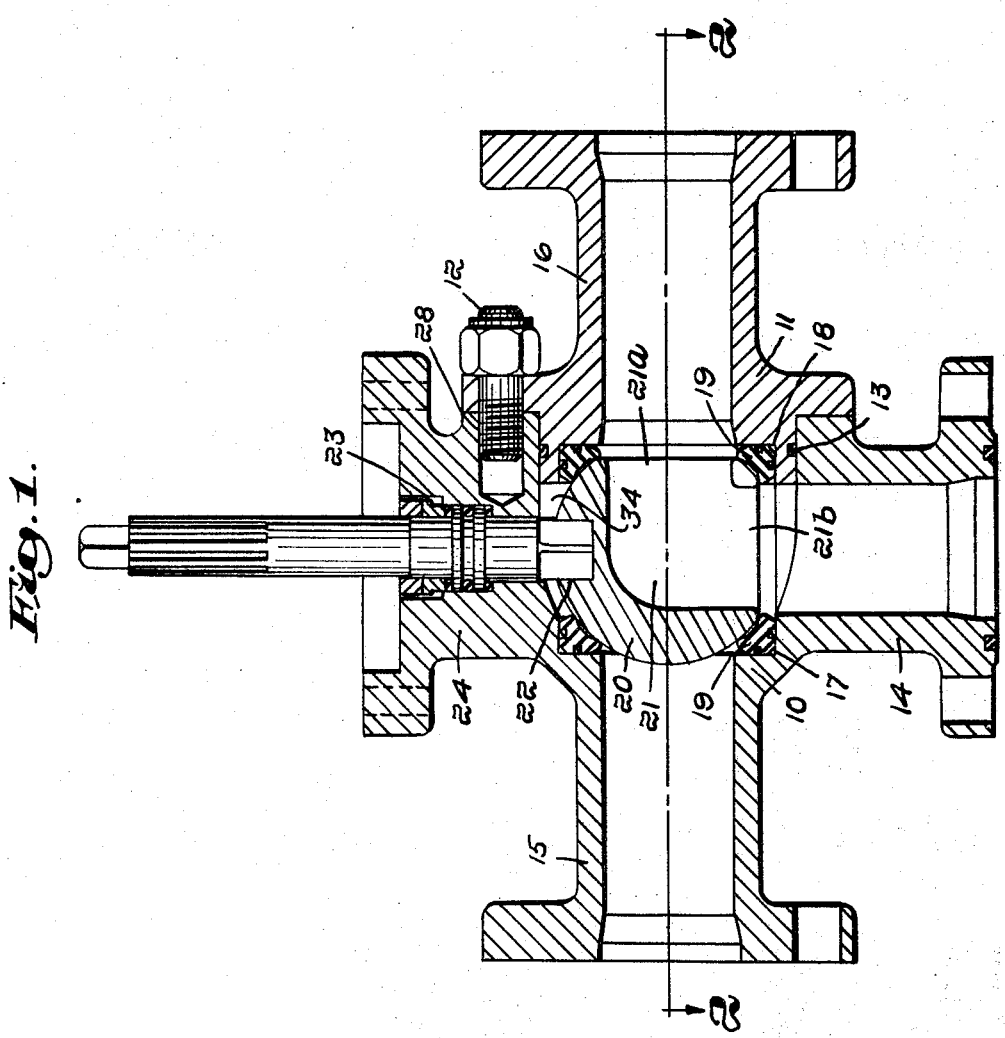
Inventor:
William W. Rawstron,
by Arthur D. Thomson
Attorney

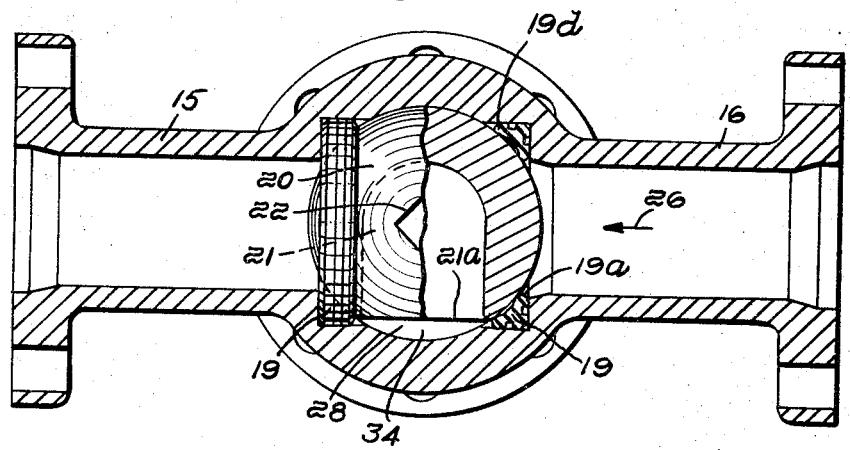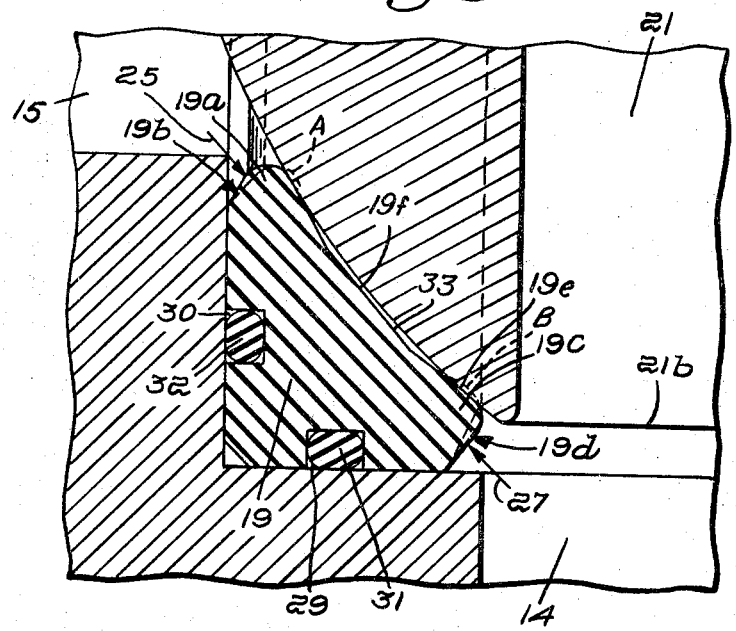

United States Patent Office 3,345,032
Patented Oct. 3, 1967

3,345,032
THREE-WAY BALL VALVE
William W. Rawstron, Worcester, Mass., assignor to Jamesbury Corp., Worcester, Mass., a corporation of Massachusetts
Filed Nov. 10, 1964, Ser. No. 411,966
6 Claims. (Cl. 251—172)

The present application is a continuation-in-part of my previous application Serial No. 110,909, filed May 18, 1961.

This invention relates to ball valves, and more particularly to valves of the type employing seat rings with flexible lips, for example, as shown in Patent No. 2,945,666 to Howard G. Freeman.

The valve described in the aforesaid patent is a two-way valve employing a ball with a straight through passage, and a pair of seat rings, one disposed on each side of the ball, carrying inwardly extending flexible lips. The ball can be turned between an open position in which its passage is aligned with the pipe line, and a closed position in which its passage is transverse to the pipe line. The ball is engaged by the flexible lips of the seat rings and has a floating connection with its stem. In the closed position, pressure on the upstream side of the ball causes it to move into tighter sealing engagement with the downstream ring.

The present invention relates to a three-way valve having a ball with an L-shaped passage and two open positions in which the passage connects one pipe with either of two other pipes. The pipes are arranged in a T formation, with the first pipe forming the stem of the T. The valve has seat rings on either side of the ball, between the ball and the last two pipes. The ball can be turned to a closed position in which the passage is not in communication with either of the last two pipes. In this position, if the first pipe is connected to the pressure side of the line, the ball does not tend to move toward either seat ring, because the direction of force is transverse to their axes, therefore, movement of the ball cannot be utilized to seal the valve on the downstream side.

The principal object of this invention is to produce a three-way valve which seals effectively when any one of the three pipe lines to which it is connected is connected to the pressure side of the line. This is accomplished by using seat rings, each of which has two spaced flexible lips. One lip of each ring is bendable in the axial direction of the ring to seal under pressure from that direction, and the other lip is bendable in the radial direction. Other advantages and novel features will be apparent from the following description.

In the drawings illustrating the invention:

FIG. 1 is a cross-section, taken along the axis of rotation of the ball, of a valve constructed according to the invention;

FIG. 2 is a cross-section taken along line 2—2 of FIG. 1, the ball and ring assembly being shown partially in plan view; and FIG. 3 is an enlarged, fragmentary cross-section taken in the region of one of the rings.

The working parts of the valve are enclosed in a casing consisting of two sections 10 and 11 secured together by bolts 12 and sealed by an O-ring 13. The casing is generally similar to a T-connection and has pipe coupling extensions 14, 15 and 16, disposed in T-formation to which piping can be connected in any suitable manner. The extensions are here shown as designed for a flange type of pipe connection but they may be internally or externally threaded, or otherwise connected to piping.

The casing has cylindrical grooves 17 and 18 in which a pair of seat rings 19, of the same shape but reversed in position, are mounted. A ball 20 having an L-shaped passage 21 terminating in ports 21a and 21b, is mounted between the seat rings. The ball has a square recess 22 which is engaged by the squared lower end of a stem 23, by which the ball can be rotated to any one of its three positions. Port 21b is centered on the axis of rotation of the ball. The stem extends outward through a bonnet 23, which is part of the casing, and is secured in the usual manner by a bonnet cap (not shown).

The cross-sectional shape of a seal ring 19 is illustrated in detail in FIG. 3. The ring is generally triangular and has a flexible lip 19a engaging the ball around the entrance to extension 15. The lip 19a has a bevelled surface 19b on the side away from the ball, sloping away from the casing so that the lip is free to bend in the axial direction of the ring. Ring 19 has a second flexible lip 19c, extending in the axial direction of the ring. This lip has a bevelled face 19d sloping away from the casing around extension 14 and is free to bend in the radial direction of the ring. Lip 19c has an upper surface 19e which engages the ball all around at a region spaced from the region of engagement of lip 19a and nearer the center of the ball. The ring has a surface 19f between the lips, facing toward, and spaced from, the ball.

Lips 19a and 19c are initially of the shape shown by the dotted outlines A and B respectively. The casing is designed so that the spacing of grooves 17 and 18 is somewhat less than the overall dimension of the ball and rings, in order to produce a certain amount of interference between the ball and the lips. When the valve is assembled, both lips 19a and 19c of the rings are slightly deflected as shown by their full line outlines in FIG. 3. The deflection is shown exaggerated for clarity and may be relatively small, in the neighborhood of a few thousandths of an inch. This figure shows a detail of the left-hand ring. The right-hand ring is the same except that its position is reversed from left to right.

The spacing between lips 19c of the two rings is larger than the diameter of port 21b so that these lips seat on solid surface all around in any of the ball's three positions.

It will be noted that surfaces 19b and 19d are slanted in such a way that the line pressure on these surfaces, acting in a direction normal to the surfaces, as indicated by arrows 25 and 27 respectively, will cause lips 19a and 19d to seal more tightly against the ball as the pressure increases. Surface 19f and lips 19a and 19c define, with the ball surface, an enclosed space 33, to which the line pressure is not transmitted. The two lips, with the isolated space 33 between them, provide a more effective seal than either lip could provide alone. If lip 19c were omitted, for example, and extension 14 were connected to the pressure side of the line, the fluid pressure would tend to bend lip 19a away from the ball. Similarly, if lip 19a were omitted, and extension 15 were connected to the pressure side of the line, the fluid pressure would tend to bend lip 19c away from the ball. In either case, the initial mechanical deflection of the lip would have to be depended on for sealing, and would have to be high enough to resist the highest expected pressure. The two spaced lips provide a seal which seals more tightly as the pressure rises, regardless of the direction in which the valve is connected in the line. The initial mechanical pressure can be low, with resultant low friction between the ball and the seat and low stress on the seat.

If a pressure differential exists between extensions 15 and 16, the ball will tend to move toward the low pressure side, and may, under high enough pressure, seat on surface 19f of the ring on the low pressure side. The spacing between this surface and the ball is small enough to prevent the ball from moving out of contact with the lip 19a of the upstream ring which lip bends to follow the ball movement.

The lips 19c seal off a cylindrical region 34 in the casing around the central part of the wall. This region is in communication at all times with extension 14 and is therefore filled with fluid at the pressure of that line. As the ball is completely surrounded by the fluid in region 34, the net force on the ball is balanced in all directions normal to the axis of the rings, so that the ball remains centered with respect to the rings. The force on surfaces 19d is also uniform all around the ball.

The dual flexible lips of the seat rings will yield to accommodate dimensional changes due to temperature changes, so that the valve operates effectively over a wide range of temperatures.

The seat rings may be made of materials of various degrees of flexibility, such as natural or synthetic rubber, or nylon, or similar plastics, depending on the use for which the valve is intended. If the rings are made of fairly rigid material they may be provided with grooves 29 and 30 in which elastic O-rings 31 and 32 are disposed, to insure a seal between rings 19 and the casing. Seat rings of higher elasticity will seal adequately against the casing without O-rings.

The three way valve here described is leakproof in any direction in which it is connected in the line, is long wearing, and requires relatively low operating torque.

It is understood that this seat ring construction may also be used for an angle valve of construction similar to that shown, but with one of the side couplings omitted.

What is claimed is:

1. A ball valve comprising a casing having a valve chamber and a first and a second opening communicating with said chamber at an angle to one another, a ball mounted in said chamber and having a through passage terminating in two ports, one of said ports being continually in communication with said first opening and the ball being rotatable to turn the other of said ports into and out of communication with said second opening, and a seat ring surrounding said second opening, and disposed between said first and second openings, said ring having a pair of spaced flexible lips standing free of said casing and unsupported by said casing both said lips simultaneously being in sealing engagement with the ball all around the ring, the lip nearest said second opening extending inward in the radial direction of the ring and being bendable in the axial direction and the other lip extending generally axially with respect to the ring and being bendable in the radial direction.

2. A ball valve as described in claim 1, said lips having oblique surfaces facing away from the ball and exposed to fluid entering the respective adjacent openings in the casing.

3. A ball valve as described in claim 1, said ring having a surface intermediate said lips and spaced from said ball defining, with the ball and said lips, an enclosed region.

4. A ball valve comprising a casing having a valve chamber and first, second, and third openings communicating with said chamber, said first opening being disposed substantially at right angles to said second and third openings, a ball mounted in said chamber and having a passage terminating in two ports, one of said ports being continually in communication with said first opening and the ball being rotatable to three positions in which the other of said ports is in register with said second opening, out of register with all said openings, and in register with said third opening, respectively, and a pair of seat rings one surrounding said second opening, and one surrounding said third opening, each of said rings having a first lip extending inward in the radial direction of the ring and a second lip extending in the axial direction of the ring, the lips of each ring being unsupported by said casing and both simultaneously being in sealing engagement with said ball in spaced relationship to each other, the first lip of each ring being bendable in the axial direction of the ring and the second lip of each ring being bendable in the radial direction of the ring.

5. A ball valve comprising a casing having a valve chamber and first, second, and third openings communicating with said chamber, said second and third openings being disposed opposite each other and said first opening being disposed substantially at right angles to said second and third openings, a ball mounted in said chamber and having a passage terminating in two ports, one of said ports being continually in communication with said first opening and the ball being rotatable to three positions in which the other of said ports is in register with said second opening, out of register with all said openings, and in register with said third opening, respectively, and a pair of seat rings one surrounding said second opening and one surrounding said third opening, on opposite sides of the ball, each of said rings having a first lip extending inward in the radial direction of the ring and a second lip extending in the axial direction of the ring, the lips of each ring being unsupported by said casing and both simultaneously by being in sealing engagement with said ball in spaced relationship to each other and said second lips being disposed on opposite sides of, and spaced from, the port in register with said first opening, the first lip of each ring being bendable in the radial direction of the ring and the second lip of each ring being bendable in the axial direction of the ring.

6. A ball valve as described in claim 1, both said lips being simultaneously deflected by said ball in the directions in which they are bendable.

References Cited

UNITED STATES PATENTS

| | | | |
|---|---|---|---|
| 2,858,098 | 10/1958 | Sanctuary | 251—317 |
| 2,945,666 | 7/1960 | Freeman et al. | 251—175 X |
| 2,989,990 | 6/1961 | Bass et al. | 251—172 X |

M. CARY NELSON, *Primary Examiner.*

A. ROSENTHAL, *Examiner.*